United States Patent
Chen et al.

(10) Patent No.: US 12,262,387 B2
(45) Date of Patent: *Mar. 25, 2025

(54) PROCESSING METHOD, DEVICE, TERMINAL AND APPARATUS FOR PARTIAL BANDWIDTH DEACTIVATION TIMER

(71) Applicant: DATANG MOBILE COMMUNICATIONS EQUIPMENT CO., LTD., Beijing (CN)

(72) Inventors: Li Chen, Beijing (CN); Bertrand Pierre, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 11 days.

This patent is subject to a terminal disclaimer.

(21) Appl. No.: 18/155,082

(22) Filed: Jan. 17, 2023

(65) Prior Publication Data

US 2023/0171781 A1    Jun. 1, 2023

Related U.S. Application Data

(63) Continuation of application No. 16/755,887, filed as application No. PCT/CN2018/109517 on Oct. 9, 2018, now Pat. No. 11,589,375.

(30) Foreign Application Priority Data

Nov. 17, 2017    (CN) .......................... 201711147913.6

(51) Int. Cl.
*H04W 72/21* (2023.01)
*H04L 5/00* (2006.01)
(Continued)

(52) U.S. Cl.
CPC .......... *H04W 72/21* (2023.01); *H04L 5/0098* (2013.01); *H04W 72/1273* (2013.01); *H04W 74/0833* (2013.01)

(58) Field of Classification Search
CPC ......... H04W 72/1278; H04W 72/1284; H04W 72/1263; H04W 72/1273; H04W 74/08;
(Continued)

(56) References Cited

U.S. PATENT DOCUMENTS

2019/0044811 A1* 2/2019 Miao ..................... H04L 5/001
2019/0045491 A1* 2/2019 Zhang ................ H04W 72/232
(Continued)

FOREIGN PATENT DOCUMENTS

EP    3723321 A1    10/2020

*Primary Examiner* — Warner Wong
(74) *Attorney, Agent, or Firm* — Kilpatrick Townsend & Stockton LLP

(57) ABSTRACT

The present application discloses a processing method, device, terminal and apparatus for partial bandwidth deactivation timer, including: receiving an instruction related to the uplink transmission sent by the network side; starting or restarting the partial bandwidth deactivation timer according to the received instruction. The present application clarifies the specific working mechanism of the partial bandwidth deactivation timer, and the terminal and the base station can perform signaling and data transmission on the correct resources, to avoid signaling and data transmission errors and resource waste.

9 Claims, 1 Drawing Sheet

Receiving an instruction related to uplink transmission sent by the network side ⟩ 101

Starting or restarting the band width part inactivity timer according to the received instruction ⟩ 102

(51) Int. Cl.
*H04W 72/1273* (2023.01)
*H04W 74/0833* (2024.01)

(58) Field of Classification Search
CPC . H04W 74/0833; H04W 76/38; H04W 28/00; H04L 5/0091; H04L 5/0096; H04L 5/0098; H04L 29/06993; H04L 1/1848; H04L 1/1861; H04L 1/188; H04L 1/1893; H04L 41/0896; H04L 47/76
See application file for complete search history.

(56) References Cited

U.S. PATENT DOCUMENTS

| | | | |
|---|---|---|---|
| 2019/0090299 A1* | 3/2019 | Ang | H04W 52/0229 |
| 2019/0132845 A1* | 5/2019 | Babaei | H04L 1/1812 |
| 2019/0141546 A1* | 5/2019 | Zhou | H04L 5/001 |
| 2019/0149421 A1* | 5/2019 | Jin | H04L 5/0078 |
| | | | 370/331 |
| 2020/0077323 A1* | 3/2020 | Park | H04L 5/1469 |
| 2020/0236677 A1* | 7/2020 | Cui | H04W 16/14 |
| 2020/0245207 A1* | 7/2020 | Jiang | H04L 5/0044 |
| 2020/0288494 A1* | 9/2020 | Heo | H04W 72/20 |
| 2020/0337051 A1* | 10/2020 | Chang | H04W 74/0833 |
| 2021/0368545 A1* | 11/2021 | Xu | H04W 74/0833 |

* cited by examiner

US 12,262,387 B2

PROCESSING METHOD, DEVICE, TERMINAL AND APPARATUS FOR PARTIAL BANDWIDTH DEACTIVATION TIMER

The present application is a continuation of U.S. patent application Ser. No. 16/755,887, filed on Apr. 14, 2020, which is a national stage application of International Application No. PCT/CN2018/109517, filed Oct. 9, 2018, which claims priority from Chinese Patent Application No. 201711147913.6, filed with the Chinese Patent Office on Nov. 17, 2017, all of which are hereby incorporated by reference in their entireties.

FIELD

The present application relates to the field of wireless communication technologies, and particularly to a method, apparatus, terminal and device for processing a Band Width Part inactivity timer (BWP inactivity timer).

BACKGROUND

In a traditional Long Term Evolution (LTE) system, the cell bandwidth at the network side is less than or equal to the receiving bandwidth of 20 MHz of the terminal, so the network side always allocates the total uplink and downlink bandwidth of the cell to the terminal, and the terminal can work over the entire cell bandwidth. In a Next generation Radio (NR) system, the network-side bandwidth can be up to 400 MHz, which is much larger than the receiving capability of the terminal. Therefore, the concept of Band Width Part (BWP) is introduced, that is, the large bandwidth at the network side is divided into multiple BWPs, one or more BWPs are configured to the terminal, and a part of the configured BWPs are activated for uplink and downlink transmissions for the terminal, where the activated downlink BWP is called the active DL BWP, and the activated uplink BWP is called the active UL BWP. In the R15 version, for a terminal, only one DL BWP and one UL BWP are allowed to be activated at one moment, and the inactive BWPs cannot perform the uplink and downlink signaling and data transmissions.

For the BWP, the 3GPP further defines some basic concepts.

Initial BWP: for a terminal that accesses initially, it can only use the initial BWP to complete the connection establishment process. The initial BWP contains the basic cell broadcast signaling and random access resources and others.

Default BWP: the next generation NodeB (gNB) at the network side can configure a default BWP for a terminal in the connected state, and the terminal can perform some basic work on the default BWP, such as maintaining the cell connection, performing the cell measurement, initiating the random access, and the like.

Configured BWP: the BWP configured by the network side for a single terminal in the connected state, where each BWP may have different configuration content, such as Physical Uplink Control Channel (PUCCH) configuration, Semi-Persistent Schedule (SPS) configuration or the like. The DL BWP (downlink BWP) and UL BWP (uplink BWP) may be configured respectively.

Active BWP: in the BWPs configured by the network side for a terminal, the terminal only uses the active BWPs for uplink and downlink transmissions. The active BWPs are divided into active DL BWP and active UL BWP.

After configuring multiple BWPs for the terminal, the network side may use the physical layer signaling Downlink Control Indicator (DCI) to change the active BWPs, where the active uplink and downlink BWPs may be changed respectively. In addition, the BWP inactivity timer (Band Width Part inactivity timer) is introduced. When the BWP inactivity timer expires, the active DL BWP of the terminal needs to be changed to the default DL BWP.

The disadvantage in the prior art is that the working mechanism of the BWP inactivity timer has not been specified.

SUMMARY

This application provides a method, apparatus, terminal, and device for processing the band width part inactivity timer, to clarify the working mechanism of the BWP inactivity timer.

An embodiment of the present application provides a method for processing a band width part inactivity timer, including:
  receiving an instruction related to uplink transmission sent by a network side; and
  starting or restarting the band width part inactivity timer according to the received instruction.

In an implementation, the instruction is a command to change an uplink BWP, and the band width part inactivity timer for a newly active BWP is started; or
  the instruction is a scheduling command to schedule an uplink transmission PUSCH of an active BWP, and the band width part inactivity timer for the active BWP is restarted; or
  the instruction is a command to initiate random access on an active uplink BWP, and the band width part inactivity timer for the active BWP is restarted.

Here, the command to change the uplink BWP refers to: the command to change only the uplink BWP, or the uplink scheduling command to schedule another uplink BWP that is not the current uplink BWP, or the command to trigger another BWP that is not the current uplink BWP to initiate the random access.

In an implementation, the method further includes:
  when there are pre-configured uplink resources at a current moment and a terminal uses the pre-configured uplink resources to send the uplink transmission, restarting the band width part inactivity timer for the active BWP.

In an implementation, the method further includes:
  when the band width part inactivity timer expires, changing an active uplink BWP to a default uplink BWP; or
  when the band width part inactivity timer expires, changing an active uplink BWP to an initial uplink BWP if the network side does not configure the terminal with a default uplink BWP.

In an implementation, the method further includes:
  setting an uplink band width part inactivity timer for an active uplink BWP, setting a downlink band width part inactivity timer for an active downlink BWP, processing the active uplink BWP according to starting, restarting or expiry of the uplink band width part inactivity timer, and processing the active downlink BWP according to starting, restarting or expiry of the downlink band width part inactivity timer; or
  setting one band width part inactivity timer for an active uplink BWP and an active downlink BWP, and processing the active uplink BWP and the active downlink BWP simultaneously according to starting, restarting or expiry of the one band width part inactivity timer.

In an implementation, when setting the uplink band width part inactivity timer for the active uplink BWP and setting the downlink band width part inactivity timer for the active downlink BWP:

starting the band width part inactivity timer for the active downlink BWP when the downlink BWP is changed; or restarting the band width part inactivity timer for the active downlink BWP when receiving a downlink scheduling command to schedule downlink transmission for the active downlink BWP or receiving the downlink transmission sent by a base station on pre-configured resources; or changing the active downlink BWP to a default downlink BWP when the band width part inactivity timer for the active downlink BWP expires; or starting the band width part inactivity timer for the active uplink BWP when the uplink BWP is changed; or restarting the band width part inactivity timer for the active uplink BWP when receiving an indication of a trigger condition of uplink signaling or data transmission for the active uplink BWP; or changing the active uplink BWP to a default uplink BWP when the band width part inactivity timer for the active uplink BWP expires.

In an implementation, when setting one band width part inactivity timer for the active uplink BWP and the active downlink BWP:

starting or restarting the one band width part inactivity timer when the downlink BWP is changed or the uplink BWP is changed, and the one band width part inactivity timer takes effect on an active set of uplink and downlink BWPs; or restarting the one band width part inactivity timer when receiving an indication of a trigger condition of uplink and downlink transmissions, and the one band width part inactivity timer takes effect on an active set of uplink and downlink BWPs; or changing the active uplink BWP to a default uplink BWP and changing the active downlink BWP to a default downlink BWP when the one band width part inactivity timer expires.

An embodiment of the present application provides a terminal, which includes:

a transceiver configured to receive and transmit data under control of a processor to perform the process of: receiving an instruction related to uplink transmission sent by a network side; and the processor configured to read programs in a memory to perform the process of:

starting or restarting a band width part inactivity timer according to the received instruction.

In an implementation, the instruction is a command to change an uplink BWP, and the band width part inactivity timer for a newly active BWP is started; or the instruction is a scheduling command to schedule an uplink transmission PUSCH of an active BWP, and the band width part inactivity timer for the active BWP is restarted; or the instruction is a command to initiate random access on an active uplink BWP, and the band width part inactivity timer for the active BWP is restarted.

In an implementation, the process performed by the processor further includes:

when there are pre-configured uplink resources at a current moment and a terminal uses the pre-configured uplink resources to send the uplink transmission, restarting the band width part inactivity timer for the active BWP.

In an implementation, the process performed by the processor further includes:

when the band width part inactivity timer expires, changing an active uplink BWP to a default uplink BWP; or when the band width part inactivity timer expires, changing an active uplink BWP to an initial uplink BWP if the network side does not configure the terminal with a default uplink BWP.

In an implementation, the process performed by the processor further includes:

setting an uplink band width part inactivity timer for an active uplink BWP, setting a downlink band width part inactivity timer for an active downlink BWP, processing the active uplink BWP according to starting, restarting or expiry of the uplink band width part inactivity timer, and processing the active downlink BWP according to starting, restarting or expiry of the downlink band width part inactivity timer; or setting one band width part inactivity timer for an active uplink BWP and an active downlink BWP, and processing the active uplink BWP and the active downlink BWP simultaneously according to starting, restarting or expiry of the band width part inactivity timer.

In an implementation, when setting the uplink band width part inactivity timer for the active uplink BWP and setting the downlink band width part inactivity timer for the active downlink BWP:

starting the band width part inactivity timer for the active downlink BWP when the downlink BWP is changed; or restarting the band width part inactivity timer for the active downlink BWP when receiving a downlink scheduling command to schedule downlink transmission for the active downlink BWP or receiving the downlink transmission sent by a base station on pre-configured resources; or changing the active downlink BWP to a default downlink BWP when the band width part inactivity timer for the active downlink BWP expires; or starting the band width part inactivity timer for the active uplink BWP when the uplink BWP is changed; or restarting the band width part inactivity timer for the active uplink BWP when receiving an indication of a trigger condition of uplink signaling or data transmission for the active uplink BWP; or changing the active uplink BWP to a default uplink BWP when the band width part inactivity timer for the active uplink BWP expires.

In an implementation, when setting one band width part inactivity timer for the active uplink BWP and the active downlink BWP:

starting or restarting the one band width part inactivity timer when the downlink BWP is changed or the uplink BWP is changed, and the one band width part inactivity timer takes effect on an active set of uplink and downlink BWPs; or restarting the band width part inactivity timer when receiving an indication of a trigger condition of uplink and downlink transmissions, and the one band width part inactivity timer takes effect on an active set of uplink and downlink BWPs; or changing the active uplink BWP to a default uplink BWP and changing the active downlink BWP to a default downlink BWP when the one band width part inactivity timer expires.

An embodiment of the present application provides an apparatus for processing a band width part inactivity timer, including:

a receiving component configured to receive an instruction related to uplink transmission sent by a network side; and a processing component configured to start or restart the band width part inactivity timer according to the received instruction.

An embodiment of the present application further provides a computer storage medium storing a computer program thereon, where the program implements the operations of the method for processing the band width part inactivity timer described above when executed by a processor.

The present application has the following beneficial effects.

In the solution provided by the embodiments of the present application, after the instruction related to the uplink transmission sent by the network side is received, the band width part inactivity timer is started or restarted according to the received instruction, to clarify the specific working mechanism of the BWP inactivity timer.

Further, this solution also clarifies the operations of the band width part inactivity timer under different instructions, the operations when there are pre-configured uplink resources at the current moment and the terminal uses the pre-configured uplink resources to send the uplink transmission, the operations after the band width part inactivity timer expires, the operations when setting two band width part inactivity timers, the operations when setting one band width part inactivity timer, etc., to clarify the specific working mechanism of the BWP inactivity timer.

Through this solution, the terminal and the base station may perform the signaling and data transmissions on the correct resources, avoiding the signaling and data transmission errors and the waste of resources.

BRIEF DESCRIPTION OF THE DRAWINGS

The accompanying drawings illustrated here are used to provide further understanding of the present application and constitute a part of the present application, and the schematic embodiments of the present application and the illustration thereof are used to explain the present application but not limit the present application improperly. In the accompanying drawings.

DETAILED DESCRIPTION OF THE EMBODIMENTS

At present, the specific working mechanism of the BWP inactivity timer has not been specified. Especially for the active UL BWP, it has nothing to do with the timer. This may cause the following problems:

1) for the TDM (Time Division Multiplexing) mode in which the same bandwidth is used for uplink and downlink, if the active BWP is changed to the default BWP due to the expiry of the BWP inactivity timer when there is uplink transmission at the terminal, then the uplink transmission cannot be performed normally;

2) if the bandwidth resources used by uplink and downlink transmissions need to be matched, for example, the feedback resource PUCCH corresponding to the downlink transmission on the default BWP is configured only on the particular UL BWP (such as default BWP), then the downlink transmission cannot be performed normally either due to only change of the DL BWP is specified; and 3) the default BWP is generally the BWP with general functions, such as RACH (Random Access Channel) resource configuration, and if only the DL BWP is changed, the active UL BWP may contain no RACH resource and the RACH process cannot be performed.

Based on this, the embodiments of the present application will correctly maintain the transmission bandwidth, and the terminal can perform the transmission on the appropriate BWP. The specific embodiments of the present application will be illustrated below in combination with the drawings.

Figure 1:
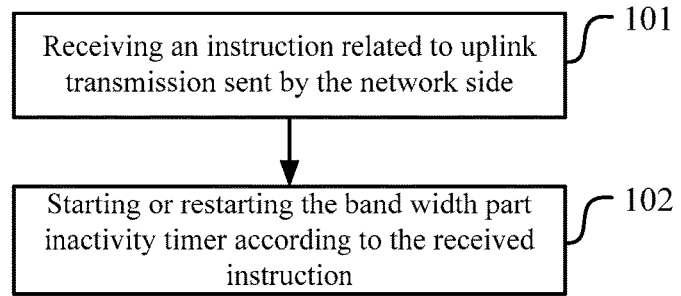
FIG. 1 is a schematic diagram of an implementation process of a method for processing a band width part inactivity timer in an embodiment of the present application.

FIG. 1 is a schematic diagram of an implementation process of a method for processing a band width part inactivity timer, and as shown, the method may include:

operation 101: receiving an instruction related to uplink transmission sent by the network side; and operation 102: starting or restarting the band width part inactivity timer according to the received instruction.

In one embodiment, the terminal starts or restarts the band width part inactivity timer (BWP inactivity timer) after receiving the instruction related to the uplink transmission sent by the network side.

In an implementation, the instruction is a command to change the UL BWP, and the band width part inactivity timer for the newly active BWP is started; or the instruction is a scheduling command to schedule the uplink transmission PUSCH of the current BWP, and the band width part inactivity timer for the active BWP is restarted; or the instruction is a command to initiate the random access on the active UL BWP, and the band width part inactivity timer for the active BWP is restarted.

In one embodiment, for the starting and restarting of the band width part inactivity timer, it may specifically be a combination of one or more following modes.

(1) After receiving the command to change the UL BWP, the terminal starts the band width part inactivity timer for the newly active BWP.

In an implementation, the command to change the UL BWP may contain: the command to change only the UL BWP, or the uplink scheduling command to schedule another UL BWP that is not the current UL BWP, or the command to trigger another BWP that is not the current UL BWP to initiate the random access.

(2) After receiving the scheduling command PDCCH to schedule the Physical Uplink Shared Channel (PUSCH) of the uplink transmission, the terminal restarts the band width part inactivity timer for the active BWP.

(3) After receiving the command (such as physical layer command PDCCH) indicating that the random access is initiated on the active uplink BWP, the terminal restarts the band width part inactivity timer for the active BWP.

In an implementation, the method may further include:

if there are pre-configured uplink resources at the current moment and the terminal uses the pre-configured uplink resources to send the uplink transmission, restarting the band width part inactivity timer for the active BWP.

In one embodiment, when there are pre-configured uplink resources at the current moment and the terminal uses the pre-configured uplink resources to send the uplink transmission, the band width part inactivity timer for the active BWP is restarted.

This solution does not necessarily require that the instruction related to the uplink transmission sent by the network side has been received in an implementation, and this is a processing solution about restarting the band width part inactivity timer, which may be implemented separately, that is, if there are pre-configured uplink resources at the current moment and the terminal uses the pre-configured uplink resources to send the uplink transmission, the band width part inactivity timer for the active BWP is restarted without determining whether to receive the instruction related to the uplink transmission.

In an implementation, the method may further include:
when the band width part inactivity timer expires, changing the active uplink BWP to the default uplink BWP; or
when the band width part inactivity timer expires, changing the active uplink BWP to the initial uplink BWP if the network side does not configure the terminal with the default uplink BWP.

In one embodiment, in an implementation, the method may further include: when the band width part inactivity timer expires, the terminal changes the active uplink BWP to the default uplink BWP, and if the network side does not configure the terminal with the default uplink BWP (UL default BWP), then the default uplink BWP is the initial uplink BWP (UL initial BWP).

In an implementation, the method may further include:
setting an uplink band width part inactivity timer for an active uplink BWP, setting a downlink band width part inactivity timer for an active downlink BWP, processing the active uplink BWP according to the starting, restarting or expiry of the uplink band width part inactivity timer, and processing the active downlink BWP according to the starting, restarting or expiry of the downlink band width part inactivity timer; or
setting one band width part inactivity timer for an active uplink BWP and an active downlink BWP, and processing the active uplink BWP and the active downlink BWP simultaneously according to the starting, restarting or expiry of the band width part inactivity timer.

In one embodiment, for the active uplink and downlink BWPs, the band width part inactivity timers may be set respectively for the uplink and downlink, or only one band width part inactivity timer may be set. If two band width part inactivity timers are set, the active uplink and downlink BWPs are maintained respectively; if one band width part inactivity timer is set, the active uplink and downlink BWPs are changed to the default uplink and downlink BWPs simultaneously after the timer expires.

When setting the uplink band width part inactivity timer for the active uplink BWP and setting the downlink band width part inactivity timer for the active downlink BWP:
starting the band width part inactivity timer for the downlink BWP when the downlink BWP is changed; or
restarting the band width part inactivity timer for the downlink BWP when receiving the downlink scheduling command to schedule the downlink transmission for the downlink BWP or receiving the downlink transmission sent by the base station on the pre-configured resources; or
changing the active downlink BWP to the default downlink BWP when the band width part inactivity timer for the downlink BWP expires; or
starting the band width part inactivity timer for the uplink BWP when the uplink BWP is changed; or
restarting the band width part inactivity timer for the uplink BWP when receiving an indication of the trigger condition of the uplink signaling or data transmission for the uplink BWP; or
changing the active uplink BWP to the default uplink BWP when the band width part inactivity timer for the uplink BWP expires.

When setting one band width part inactivity timer for the active uplink BWP and the active downlink BWP:
starting or restarting the band width part inactivity timer when the downlink BWP is changed or the uplink BWP is changed, where the band width part inactivity timer takes effect on an active set of uplink and downlink BWPs; or
restarting the band width part inactivity timer when receiving an indication of the trigger condition of the uplink and downlink transmissions, where the band width part inactivity timer takes effect on an active set of uplink and downlink BWPs; or
changing the active uplink BWP to the default uplink BWP and changing the active downlink BWP to the default downlink BWP when the band width part inactivity timer expires.

The setting of the band width part inactivity timers respectively for the uplink and downlink and the specific operations thereof will also be illustrated in the sixth embodiment below, and the setting of one uniform band width part inactivity timer and the specific operations thereof will also be illustrated in the fifth embodiment below.

In order to better understand the implementations of the present application, the embodiments will be used for illustration below.

First Embodiment

This embodiment is used to illustrate the implementation in which the network side sends the command to change the UL BWP to the terminal.

The terminal side: receives the command to change the BWP sent by the network side, sets the uplink BWP indicated by the network side as the active uplink BWP, and starts the band width part inactivity timer for the active uplink BWP.

The base station side: sends the command to change the active uplink BWP to the terminal and performs the uplink transmission with the terminal on the newly active uplink BWP, including: sending the scheduling command for the newly active uplink BWP, receiving the uplink transmission on the newly active uplink BWP, etc. The base station starts and maintains the band width part inactivity timer of the terminal for the active uplink BWP.

Second Embodiment

This embodiment is used to illustrate the implementation in which the network side sends the scheduling command to the terminal to schedule the uplink data transmission.

The terminal side: receives the scheduling command for the active uplink BWP from the network side, and restarts the band width part inactivity timer for the active uplink BWP. According to the scheduling command of the network side, the uplink transmission is sent on the active uplink BWP.

The base station side: sends the scheduling command to the terminal to schedule the uplink data transmission. The band width part inactivity timer of the terminal for the active uplink BWP is restarted. The uplink transmission of the terminal is received on the scheduled resources.

Third Embodiment

This embodiment is used to illustrate the implementation in which the network side sends the PDCCH command to the terminal to initiate the random access on the specified BWP.

The terminal side: receives the PDCCH command sent by the network side, where this command contains the random access information.

If the PDCCH command indicates that the active uplink BWP that initiates the random access is the active uplink BWP, the band width part inactivity timer for the active uplink BWP is restarted.

If the PDCCH command indicates that the uplink BWP that initiates the random access is another uplink BWP, the active uplink BWP is changed to the specified uplink BWP, and the band width part inactivity timer for the specified uplink BWP is started.

The base station side: sends the PDCCH command to the terminal to trigger the random access, performs the random access process on the specified uplink BWP, and starts or restarts the band width part inactivity timer for the uplink BWP used in the random access process.

Fourth Embodiment

This embodiment is used to illustrate the implementation in which the terminal sends the uplink transmission on the configuration resources of the active uplink BWP.

The terminal side: sends the uplink transmission on the pre-configured resources of the active uplink BWP, and simultaneously restarts the band width part inactivity timer for the active uplink BWP.

The base station side: receives the uplink transmission of the terminal on the pre-configured resources of the active uplink BWP of the terminal, and restarts the band width part inactivity timer of the terminal for the active uplink BWP.

Fifth Embodiment

This embodiment is used to illustrate the implementation in which the terminal maintains one band width part inactivity timer. In this embodiment, the terminal maintains only one band width part inactivity timer which takes effect on the active uplink and downlink BWPs simultaneously. That is, the band width part inactivity timer is set for the active uplink BWP and the active downlink BWP, and the active uplink BWP and the active downlink BWP are processed simultaneously according to the starting, restarting or expiry of the band width part inactivity timer.

Starting: starting the band width part inactivity timer when the downlink BWP is changed or the uplink BWP is changed, where the timer takes effect on an active set of uplink and downlink BWPs. For example, only the uplink BWP is changed, and the band width part inactivity timer is started for the newly active uplink BWP. For the active downlink BWP that is not actually changed, it is equivalent to restarting the band width part inactivity timer.

Restarting: restarting the band width part inactivity timer under any uplink or downlink trigger condition, including one or more of: receiving the downlink data scheduling command, receiving the uplink data scheduling command, receiving the command (PDCCH order) to initiate the random access, sending the uplink transmission on the uplink pre-configured resources, or receiving the downlink transmission on the downlink pre-configured resources.

Expiry: changing the active uplink BWP to the default uplink BWP and changing the active downlink BWP to the default downlink BWP when the band width part inactivity timer expires.

Sixth Embodiment

This embodiment is used to illustrate the implementation in which the terminal maintains two band width part inactivity timers. In this embodiment, the terminal maintains one band width part inactivity timer for each of the active uplink and downlink BWPs, where the band width part inactivity timer only takes effect on the active BWP in the corresponding transmission direction. That is, an uplink band width part inactivity timer is set for the active uplink BWP, a downlink band width part inactivity timer is set for the active downlink BWP, the active uplink BWP is processed according to the starting, restarting or expiry of the uplink band width part inactivity timer, and the active downlink BWP is processed according to the starting, restarting or expiry of the downlink band width part inactivity timer.

Downlink:

Starting: starting the band width part inactivity timer for the downlink BWP when the downlink BWP is changed.

Restarting: restarting the band width part inactivity timer under any downlink trigger condition, including one or more of: receiving the downlink data scheduling command, or receiving the downlink transmission on the pre-configured resources.

Expiry: changing the active downlink BWP to the default downlink BWP when the band width part inactivity timer expires.

Uplink

Starting: starting the band width part inactivity timer for the uplink BWP when the uplink BWP is changed.

Restarting: restarting the band width part inactivity timer under any uplink trigger condition, including one or more of: receiving the uplink data scheduling command, receiving the command (PDCCH order) to initiate the random access, or sending the uplink transmission on the uplink pre-configured resources.

Expiry: changing the active uplink BWP to the default uplink BWP when the band width part inactivity timer expires.

Based upon the embodiments of the present application further provides a terminal and an apparatus for processing a band width part inactivity timer. Since the principle solving the problem of these devices is similar to that of the method for processing the band width part inactivity timer, the implementations of these devices can refer to the implementations of the method, and the repeated description thereof will be omitted here.

Figure 2:
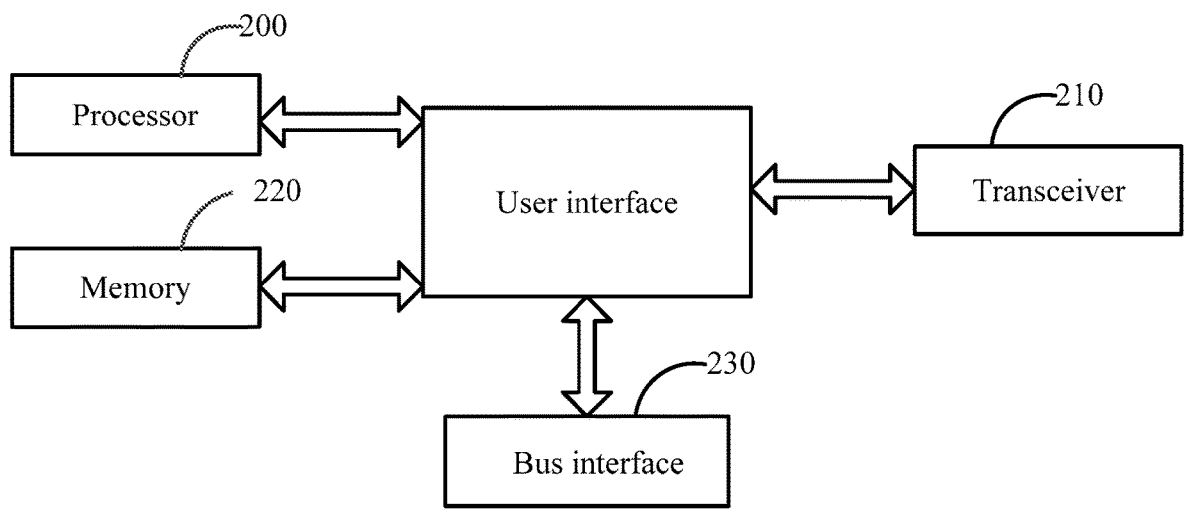
FIG. 2 is a structural schematic diagram of a terminal in an embodiment of the present application.

FIG. 2 is a structural schematic diagram of a terminal, and as shown, the terminal includes:

a transceiver 210 configured to receive and send data under control of a processor 200 to perform the process of:
    receiving an instruction related to uplink transmission sent by the network side;
the processor 200 configured to read programs in a memory 220 to perform the process of:
    starting or restarting the band width part inactivity timer according to the received instruction.
In an implementation, the instruction is a command to change the uplink BWP, and the band width part inactivity timer for the newly active BWP is started; or
    the instruction is a scheduling command to schedule the uplink transmission PUSCH of the current BWP, and the band width part inactivity timer for the active BWP is restarted; or
    the instruction is a command to initiate the random access on the active uplink BWP, and the band width part inactivity timer for the active BWP is restarted.
In an implementation, the process further includes:
when there are pre-configured uplink resources at the current moment and the terminal uses the pre-configured uplink resources to send the uplink transmission, restarting the band width part inactivity timer for the active BWP.
In an implementation, the process further includes:
changing the active uplink BWP to the default uplink BWP after the band width part inactivity timer expires; or
changing the active uplink BWP to the initial uplink BWP if the network side does not configure the terminal with the default uplink BWP after the band width part inactivity timer expires.
In an implementation, the process further includes:
setting an uplink band width part inactivity timer for an active uplink BWP, setting a downlink band width part inactivity timer for an active downlink BWP, processing the active uplink BWP according to the starting, restarting or expiry of the uplink band width part inactivity timer, and processing the active downlink BWP according to the starting, restarting or expiry of the downlink band width part inactivity timer; or
setting one band width part inactivity timer for an active uplink BWP and an active downlink BWP, and processing the active uplink BWP and the active downlink BWP simultaneously according to the starting, restarting or expiry of the band width part inactivity timer.
In an implementation, when setting the uplink band width part inactivity timer for the active uplink BWP and setting the downlink band width part inactivity timer for the active downlink BWP:
    starting the band width part inactivity timer for the downlink BWP when the downlink BWP is changed; or
    restarting the band width part inactivity timer for the downlink BWP when receiving the downlink scheduling command to schedule the downlink transmission for the downlink BWP or receiving the downlink transmission sent by the base station on the pre-configured resources; or
    changing the active downlink BWP to the default downlink BWP when the band width part inactivity timer for the downlink BWP expires; or
    starting the band width part inactivity timer for the uplink BWP when the uplink BWP is changed; or
    restarting the band width part inactivity timer for the uplink BWP when receiving an indication of the trigger condition of the uplink signaling or data transmission for the uplink BWP; or
    changing the active uplink BWP to the default uplink BWP when the band width part inactivity timer for the uplink BWP expires.
In an implementation, when setting one band width part inactivity timer for the active uplink BWP and the active downlink BWP:
    starting or restarting the band width part inactivity timer when the downlink BWP is changed or the uplink BWP is changed, where the band width part inactivity timer takes effect on an active set of uplink and downlink BWPs; or
    restarting the band width part inactivity timer when receiving an indication of the trigger condition of the uplink and downlink transmissions, where the band width part inactivity timer takes effect on an active set of uplink and downlink BWPs; or
    changing the active uplink BWP to the default uplink BWP and changing the active downlink BWP to the default downlink BWP when the band width part inactivity timer expires.

Here, in FIG. 2, the bus architecture may include any numbers of interconnected buses and bridges, and specifically link various circuits of one or more processors represented by the processor 200 and the memory represented by the memory 220. The bus architecture may further link various other circuits such as peripheral device, voltage regulator and power management circuit, which are all well known in the art and thus will not be further described again herein. The bus interface provides an interface. The transceiver 210 may be elements, i.e., include a transmitter and a receiver, and provide the units for communicating with various other devices over the transmission media. For different user equipments, the user interface 230 may also be the interface for inter-connecting or exter-connecting with the required devices, and the connected devices include but not limited to keypad, display, loudspeaker, microphone, joystick and the like.

The processor 200 is responsible for managing the bus architecture and general processing, and the memory 220 may store the data used by the processor 200 when performing the operations.

When the embodiment of the present application is implemented, it may be implemented in such way as follows.

Figure 3:
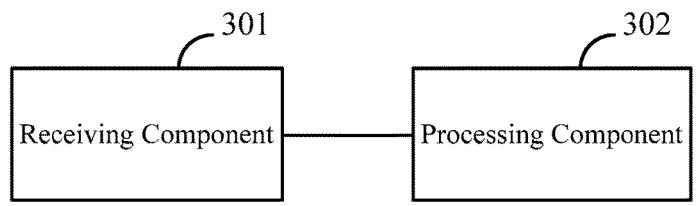
FIG. 3 is a structural schematic diagram of an apparatus for processing a band width part inactivity timer in an embodiment of the present application.

FIG. 3 is a structural schematic diagram of an apparatus for processing a band width part inactivity timer, and as shown, the apparatus may include:
    a receiving component 301 configured to receive an instruction related to uplink transmission sent by the network side; and
    a processing component 302 configured to start or restart the band width part inactivity timer according to the received instruction.

In an implementation, the instruction is a command to change the uplink BWP, and the band width part inactivity timer for the newly active BWP is started; or
    the instruction is a scheduling command to schedule the uplink transmission PUSCH of the current BWP, and the band width part inactivity timer for the active BWP is restarted; or
    the instruction is a command to initiate the random access on the active uplink BWP, and the band width part inactivity timer for the active BWP is restarted.

In an implementation, the process performed by the apparatus further includes:

when there are pre-configured uplink resources at the current moment and the terminal uses the pre-configured uplink resources to send the uplink transmission, restarting the band width part inactivity timer for the active BWP.

In an implementation, the process performed by the apparatus further includes:

changing the active uplink BWP to the default uplink BWP after the band width part inactivity timer expires; or changing the active uplink BWP to the initial uplink BWP if the network side does not configure the terminal with the default uplink BWP after the band width part inactivity timer expires.

In an implementation, the process performed by the apparatus further includes:

setting an uplink band width part inactivity timer for an active uplink BWP, setting a downlink band width part inactivity timer for an active downlink BWP, processing the active uplink BWP according to the starting, restarting or expiry of the uplink band width part inactivity timer, and processing the active downlink BWP according to the starting, restarting or expiry of the downlink band width part inactivity timer; or setting one band width part inactivity timer for an active uplink BWP and an active downlink BWP, and processing the active uplink BWP and the active downlink BWP simultaneously according to the starting, restarting or expiry of the band width part inactivity timer.

In an implementation, when setting the uplink band width part inactivity timer for the active uplink BWP and setting the downlink band width part inactivity timer for the active downlink BWP:

starting the band width part inactivity timer for the downlink BWP when the downlink BWP is changed; or restarting the band width part inactivity timer for the downlink BWP when receiving the downlink scheduling command to schedule the downlink transmission for the downlink BWP or receiving the downlink transmission sent by the base station on the pre-configured resources; or changing the active downlink BWP to the default downlink BWP when the band width part inactivity timer for the downlink BWP expires; or starting the band width part inactivity timer for the uplink BWP when the uplink BWP is changed; or restarting the band width part inactivity timer for the uplink BWP when receiving an indication of the trigger condition of the uplink signaling or data transmission for the uplink BWP; or changing the active uplink BWP to the default uplink BWP when the band width part inactivity timer for the uplink BWP expires.

In an implementation, when setting one band width part inactivity timer for the active uplink BWP and the active downlink BWP:

starting or restarting the band width part inactivity timer when the downlink BWP is changed or the uplink BWP is changed, where the band width part inactivity timer takes effect on an active set of uplink and downlink BWPs; or restarting the band width part inactivity timer when receiving an indication of the trigger condition of the uplink and downlink transmissions, where the band width part inactivity timer takes effect on an active set of uplink and downlink BWPs; or changing the active uplink BWP to the default uplink BWP and changing the active downlink BWP to the default downlink BWP when the band width part inactivity timer expires.

For the sake of description, all the parts of the above-mentioned device are divided into various modules or components by function, which are described respectively. Of course, the functions of the various modules or components may be implemented in the same one or more softwares or hardwares when the present application is implemented.

In summary, the embodiments of the present application clarifies the specific working mechanism of the BWP inactivity timer. Through the embodiments of the present application, the terminal and the base station may perform the signaling and data transmissions on the correct resources, avoiding the signaling and data transmission errors and the waste of resources.

An embodiment of the present application further provides a computer-readable non-volatile storage medium including the program codes which are configured, when running on a computing terminal, to cause the computing terminal to perform the operations of the method for processing the band width part inactivity timer in the embodiments of the present application described above.

The embodiments of the present application may be provided as methods, systems and computer program products. Thus the present application may take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is for guiding the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions may also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Various modifications and variations to the present application can be made without departing from the spirit and scope of the present application. Thus the present application is also intended to encompass these modifications and variations therein as long as these modifications and variations to the present application come into the scope of the claims of the present application and their equivalents.

What is claimed is:

1. A method for processing a band width part inactivity timer, comprising:
   when there are pre-configured uplink resources at a current moment and the pre-configured uplink resources are used by a terminal to send an uplink transmission, restarting, by the terminal, a band width part inactivity timer for an active BWP; and
   when the band width part inactivity timer expires, changing an active uplink BWP to a default uplink BWP; or
   when the band width part inactivity timer expires, changing an active uplink BWP to an initial uplink BWP if the network side does not configure a terminal with a default uplink BWP.

2. The method of claim 1, further comprising:
   setting an uplink band width part inactivity timer for an active uplink BWP, setting a downlink band width part inactivity timer for an active downlink BWP, processing the active uplink BWP according to starting, restarting or expiry of the uplink band width part inactivity timer, and processing the active downlink BWP according to starting, restarting or expiry of the downlink band width part inactivity timer; or
   setting one band width part inactivity timer for an active uplink BWP and an active downlink BWP, and processing the active uplink BWP and the active downlink BWP simultaneously according to starting, restarting or expiry of the one band width part inactivity timer.

3. The method of claim 2, wherein when setting the uplink band width part inactivity timer for the active uplink BWP and setting the downlink band width part inactivity timer for the active downlink BWP:
   starting the band width part inactivity timer for the active downlink BWP when the downlink BWP is changed; or
   restarting the band width part inactivity timer for the active downlink BWP when receiving a downlink scheduling command to schedule downlink transmission for the active downlink BWP or receiving the downlink transmission sent by a base station on pre-configured resources; or
   changing the active downlink BWP to a default downlink BWP when the band width part inactivity timer for the active downlink BWP expires; or
   starting the band width part inactivity timer for the active uplink BWP when the uplink BWP is changed; or
   restarting the band width part inactivity timer for the active uplink BWP when receiving an indication of a trigger condition of uplink signaling or data transmission for the active uplink BWP; or
   changing the active uplink BWP to a default uplink BWP when the band width part inactivity timer for the active uplink BWP expires.

4. The method of claim 2, wherein when setting one band width part inactivity timer for the active uplink BWP and the active downlink BWP:
   starting or restarting the one band width part inactivity timer when the downlink BWP is changed or the uplink BWP is changed, wherein the one band width part inactivity timer takes effect on an active set of uplink and downlink BWPs; or
   restarting the one band width part inactivity timer when receiving an indication of a trigger condition of uplink and downlink transmissions, wherein the one band width part inactivity timer takes effect on an active set of uplink and downlink BWPs; or
   changing the active uplink BWP to a default uplink BWP and changing the active downlink BWP to a default downlink BWP when the one band width part inactivity timer expires.

5. A terminal, comprising:
   a processor and a memory;
   wherein the processor is configured to read programs in the memory to perform a process of:
   when there are pre-configured uplink resources at a current moment and the pre-configured uplink resources are used by the terminal to send an uplink transmission, restarting a band width part inactivity timer for an active BWP; and
   the process performed by the processor further comprises:
   when the band width part inactivity timer expires, changing an active uplink BWP to a default uplink BWP; or
   when the band width part inactivity timer expires, changing an active uplink BWP to an initial uplink BWP if the network side does not configure a terminal with a default uplink BWP.

6. The terminal of claim 5, wherein the process performed by the processor further comprises:
   setting an uplink band width part inactivity timer for an active uplink BWP, setting a downlink band width part inactivity timer for an active downlink BWP, processing the active uplink BWP according to starting, restarting or expiry of the uplink band width part inactivity timer, and processing the active downlink BWP according to starting, restarting or expiry of the downlink band width part inactivity timer; or
   setting one band width part inactivity timer for an active uplink BWP and an active downlink BWP, and processing the active uplink BWP and the active downlink BWP simultaneously according to starting, restarting or expiry of the one band width part inactivity timer.

7. The terminal of claim 6, wherein when setting the uplink band width part inactivity timer for the active uplink BWP and setting the downlink band width part inactivity timer for the active downlink BWP:
   starting the band width part inactivity timer for the active downlink BWP when the downlink BWP is changed; or
   restarting the band width part inactivity timer for the active downlink BWP when receiving a downlink scheduling command to schedule downlink transmission for the active downlink BWP or receiving the downlink transmission sent by a base station on pre-configured resources; or
   changing the active downlink BWP to a default downlink BWP when the band width part inactivity timer for the active downlink BWP expires; or
   starting the band width part inactivity timer for the active uplink BWP when the uplink BWP is changed; or
   restarting the band width part inactivity timer for the active uplink BWP when receiving an indication of a trigger condition of uplink signaling or data transmission for the active uplink BWP; or
   changing the active uplink BWP to a default uplink BWP when the band width part inactivity timer for the active uplink BWP expires.

8. The terminal of claim 6, wherein when setting one band width part inactivity timer for the active uplink BWP and the active downlink BWP:
- starting or restarting the one band width part inactivity timer when the downlink BWP is changed or the uplink BWP is changed, wherein the one band width part inactivity timer takes effect on an active set of uplink and downlink BWPs; or
- restarting the band width part inactivity timer when receiving an indication of a trigger condition of uplink and downlink transmissions, wherein the one band width part inactivity timer takes effect on an active set of uplink and downlink BWPs; or
- changing the active uplink BWP to a default uplink BWP and changing the active downlink BWP to a default downlink BWP when the one band width part inactivity timer expires.

9. A machine-readable non-volatile storage medium, wherein the storage medium stores a computer program thereon, and the computer program implements operations of the method of claim 1 when executed by a processor.

* * * * *